United States Patent [19]

Shimamura

[11] Patent Number: 5,107,661
[45] Date of Patent: Apr. 28, 1992

[54] LAWN MOWER
[75] Inventor: Teruo Shimamura, Osaka, Japan
[73] Assignee: Kubota Corporation, Osaka, Japan
[21] Appl. No.: 672,512
[22] Filed: Mar. 20, 1991
[30] Foreign Application Priority Data May 1, 1990 [JP] Japan .................. 2-46737[U]

[51] Int. Cl.$^5$ .................................. A01D 34/70
[52] U.S. Cl. ........................ 56/12.8; 15/347; 56/202
[58] Field of Search ............ 56/16.6, 12.8, 12.9, 56/202, DIG. 8, DIG. 9; 15/340.1, 340.3, 347

[56] References Cited
U.S. PATENT DOCUMENTS

| | | | |
|---|---|---|---|
| 3,984,893 | 10/1976 | Ashley | 56/DIG. 8 X |
| 4,310,998 | 1/1982 | Cuba | 56/202 |
| 4,723,398 | 2/1988 | Flenniken et al. | 56/16.6 |
| 4,868,948 | 9/1989 | Arnold | 15/340.1 |
| 4,969,320 | 11/1990 | Langford | 56/202 X |

Primary Examiner—David J. Bagnell
Attorney, Agent, or Firm—Jordan and Hamburg

[57] ABSTRACT

A lawn mower comprises an engine disposed in a rear portion of a vehicle frame, a cooling fan for producing cooling air flows for the engine, and an engine hood including a discharge opening for discharging engine cooling air rearwardly of the vehicle frame. A mower unit is disposed forwardly of the vehicle frame for cutting grass and blowing grass clippings rearwardly through a duct to a grass catcher mounted upwardly of the engine hood. The grass catcher includes an air vent disposed upwardly of the engine hood for discharging grass conveying air flows toward cooling air flows discharged from the engine hood. The conveying air flows join the cooling air flows to drift rearwardly away from the vehicle body.

6 Claims, 3 Drawing Sheets

＃ LAWN MOWER

BACKGROUND OF THE INVENTION

1. Field of the Invention

The present invention relates to a lawn mower having a grass catcher for collecting grass clippings transported on air flows from a mower unit. More particularly, the invention relates to a lawn mower carrying an engine rearwardly of a vehicle body, and a grass catcher upwardly of a hood covering the engine.

2. Description of the Prior Art

A lawn mower of this type is disclosed in U.S. Pat. No. 4,723,398, for example. The known lawn mower has a mower unit disposed forwardly of a vehicle body, an engine rearwardly of the vehicle body, and a grass catcher suspended laterally of the engine from a position upwardly thereof for collecting grass clippings transported from the mower unit. Air flows carrying the grass clippings are discharged through an opening defined in a front wall of a cover placed over the grass catcher.

A further lawn mower of the same type is disclosed in Japanese Patent Application No. 1989-262643 filed Oct. 7, 1989 and owned by Applicant. This lawn mower has a grass catcher disposed on right and left sides of an engine hood in a way to straddle the hood. Air flows having carried grass clippings to the grass catcher are discharged downwardly and rearwardly from rear ends of covers placed on respective grass collecting bags.

With the lawn mower disclosed in the U.S. patent, however, the discharge air flows directly reach a driver's region, thereby to aggravate working environment of the driver and environment of cooling air intake for the engine. With the lawn mower disclosed in the above Japanese application also, the discharge air flows containing large quantities of trash and dust encroach on the driver's section since the lawn mower moves slowly during a grass cutting operation. This brings about the inconveniences of aggravating working environment of the driver, and clogging cooling air intake openings of the engine to cause an overheat of the engine.

SUMMARY OF THE INVENTION

An object of the present invention is to improve the working environment of the driver and environment of cooling air intake for the engine in a lawn mower having an engine mounted rearwardly of a vehicle body, and a grass catcher disposed upwardly of the engine.

The above object is fulfilled, according to the present invention, by a lawn mower having a cooling air discharge opening for directing engine cooling air flows rearwardly of a vehicle body, and a conveying air discharge opening for discharging air flows that have transported grass clippings to a grass catcher toward the discharged cooling air flows.

With this construction, the conveying air flows are discharged into confluence with the engine cooling air flows discharged rearwardly. As a result, trash dust and the like are forcibly blown rearwardly.

Thus, the discharged engine cooling air flows are effectively used to minimize the discharged conveying air flows drifting round to a driver's section. This feature improves the working environment of the driver and environment of cooling air intake for the engine.

Other objects and features of the invention will be understood from the following description made with reference to the accompanying drawings.

DETAILED DESCRIPTION OF THE PREFERRED EMBODIMENT

Figure 1:
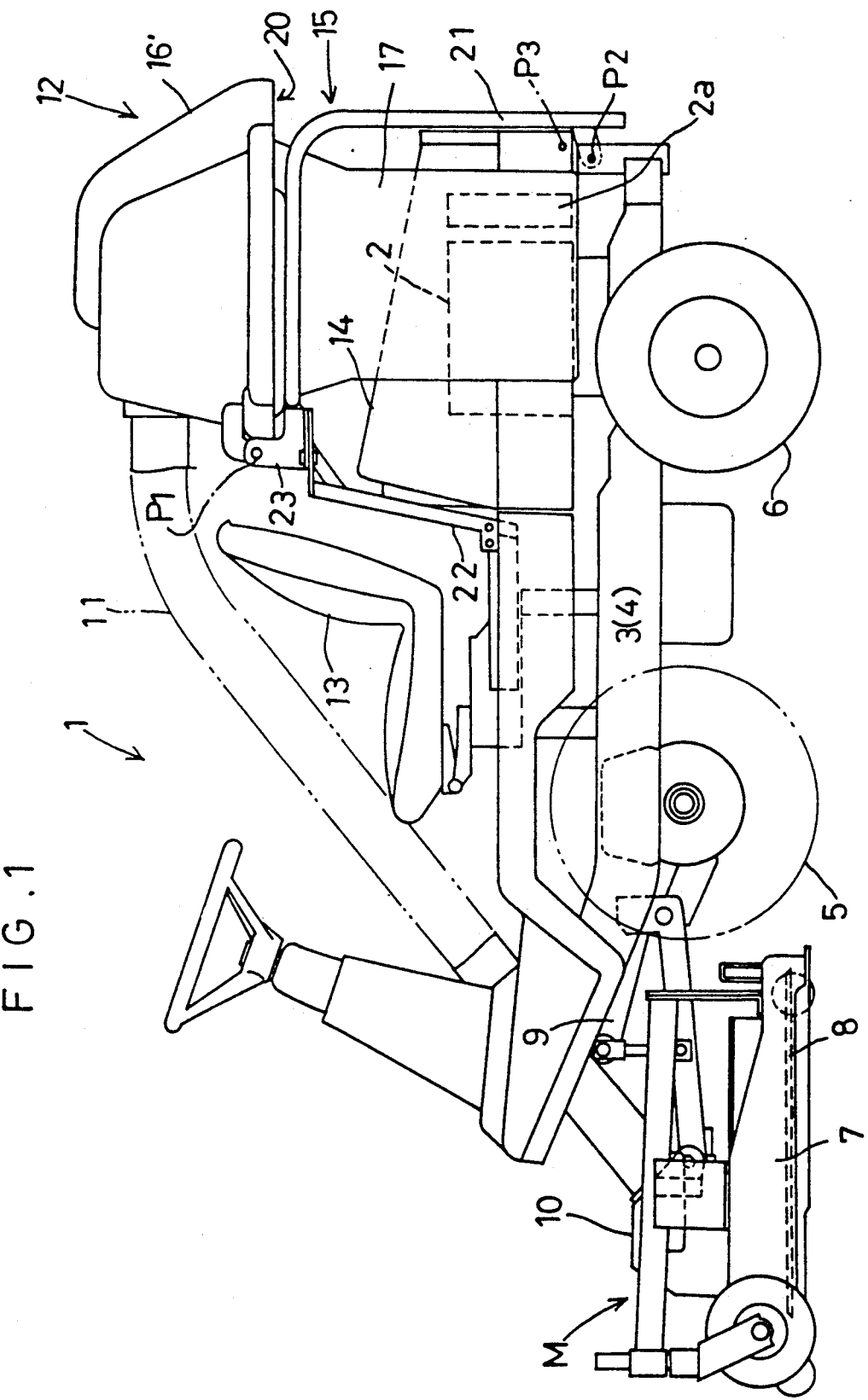
FIG. 1 is a side view of a lawn mower according to the present invention.

FIG. 1 shows a lawn mower having a driver's section 1 in a forward portion of a vehicle body, and an engine 2 in a rear portion thereof. The vehicle body includes a stepless transmission 3 and a differential 4 mounted under a floor, and is movable on front drive wheels 5 and steerable rear wheels 6. This lawn mower carries a mower unit M vertically movably suspended by a lift arm 9 forwardly of the front wheels 5. The mower unit M has a housing 7 containing three cutting blades 8. A radiator having a cooling fan 2a is disposed rearwardly of the engine 2. It is of course possible to arrange the radiator forwardly of the engine 2 or to distribute the radiator and cooling fan to front and back of the engine 2.

The mower unit M has a blower 10 attached to the righthand side thereof. Grass clippings cut by the mower unit M are transported by air flows generated by the blower 10, through a duct 11 to a grass catcher 12 to be collected therein.

Figure 2:
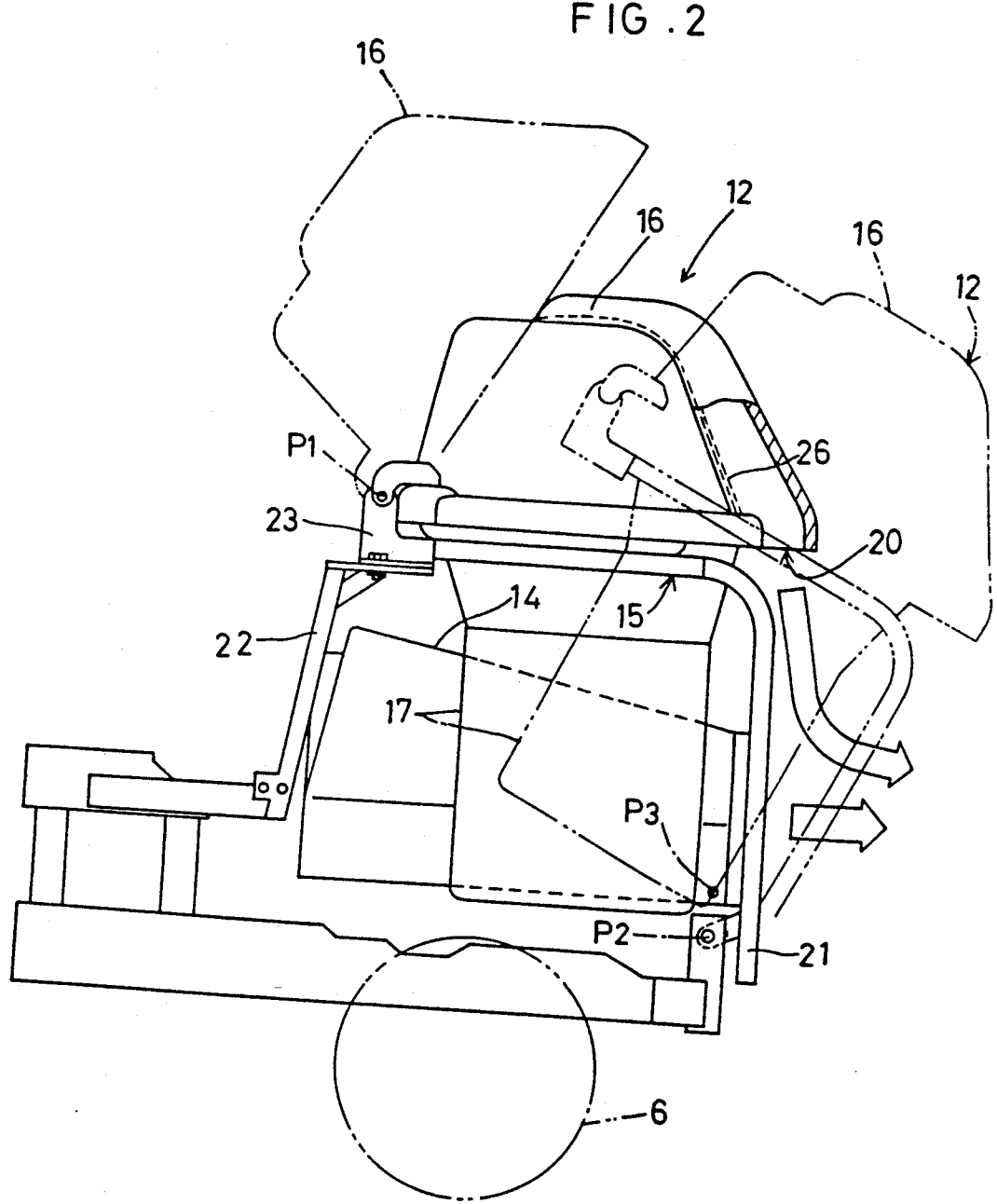
FIG 2 is an enlarged fragmentary side view showing a region including an engine and a grass catcher.

As shown in FIGS. 1 and 2, an engine hood 14 is disposed rearwardly of a driver's seat 13 for covering the engine 2. The grass catcher 12 is mounted over the engine hood 14 in a way to straddle the hood 14.

The grass catcher 12 includes a frame 15, a cover 16 and three grass collecting bags 17, 18 and 17. Each of the grass collecting bags 17, 18 and 17 is slidable to be attached to and detached from guide portions 19 of the frame 15. The transversely middle bag 18 has a reduced depth to accommodate an upward center bulge of the engine hood 14.

The cover 16 lies over top openings of the three grass collecting bags 17, 18 and 17 suspended from the frame 15, and at least partly overhangs rearwardly from these openings. Consequently, a vent 20 is defined between the cover 16 and rear edges of the grass collecting bags 17, 18 and 17, for discharging the conveying air flows delivered through the duct 11. The duct 11 is inserted into a righthand front position of the cover 16. The cover 16 has an inclined rear wall to downwardly deflect the air flows delivered through the duct 11. Consequently, the air flows are discharged substantially downwardly through the vent 20, i.e. rearwardly of the engine 2. The cover 16 is pivotable relative to the frame 15 about a transverse axis P1 at a lower end of the cover 16. Thus, the cover 16 may be swung open forwardly.

Figure 4:
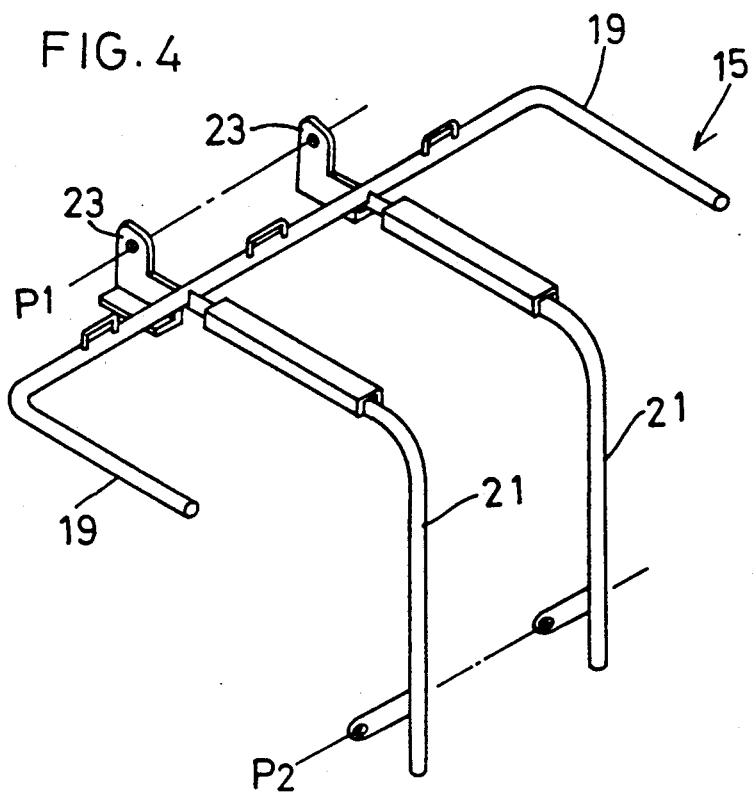
FIG. 4 is a perspective view of a supporting frame of the grass catcher.

As shown in FIG. 4, the frame 15 is formed of a pipe material to have a forked shape with four legs. Short legs 19 at opposite ends extend horizontally while the two inner legs 21 extend horizontally and are then bent downwardly. The downwardly bent legs 21 are pivotally connected at lower ends thereof to the vehicle body through a transverse axis P2. The four legs of the frame 15 are interconnected through a cross piece including lugs 23 formed on intermediate positions thereof and detachably bolted to support members 22 (FIG. 2) extending from the vehicle body.

Figure 3:
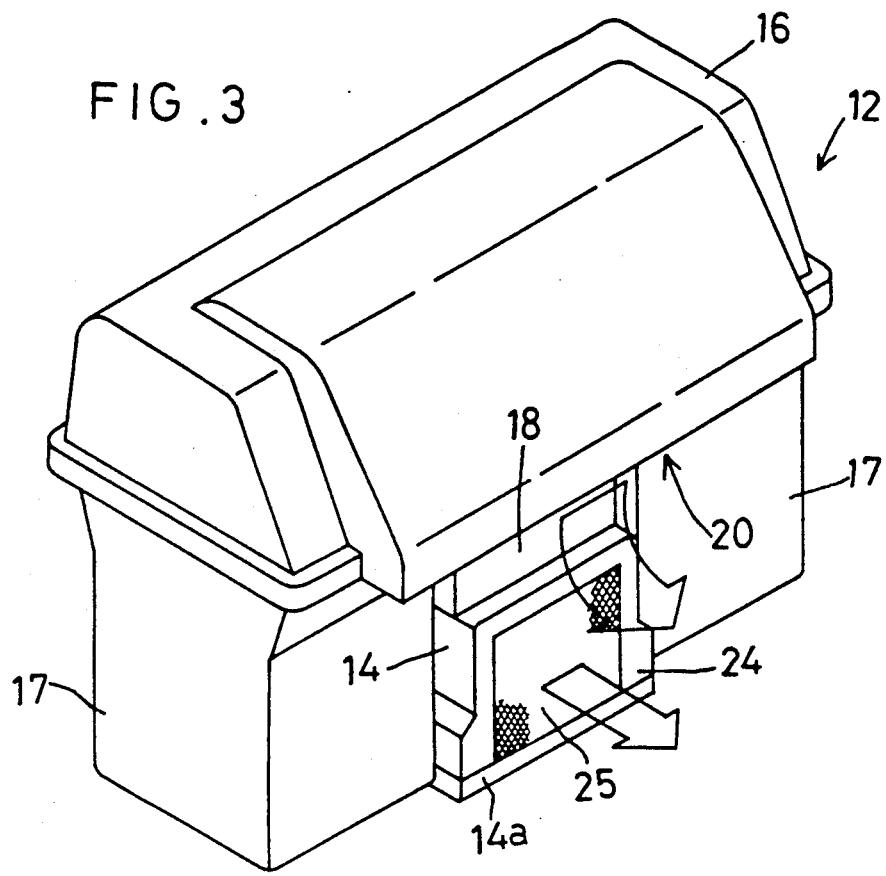
FIG. 3 is a perspective view of the grass catcher.

As shown in FIG. 3, the engine hood 14 has a sectional shape surrounding the engine 2 from above. The hood 14 defines a duct space for cooling air in combination with an auxiliary enclosure member 14a which may seal a lower region of the engine 2 as necessary. The engine hood 14 has a rear face 24 including a rear grille 25 through which cooling air of the engine 2 is discharged rearwardly. Though not shown in the drawings, the engine hood 14 defines cooling air inlets in a front and, if desired, in side faces thereof. For maintenance of the engine 12, the hood 14 may be opened by swinging the hood 14 on a transverse axis P3 at a lower rear end thereof. As shown in FIG. 2, the engine 2 may be inspected after disengaging the lugs 23 from the support members 22, tilting the grass catcher 12 rearwardly, and swinging open the engine hood 14 rearwardly.

As schematically shown in FIG. 2, the cover 16 includes a mesh member 26 mounted therein to divide the interior of the cover 16 into a space continuous with the vent 20 and a space continuous with the top openings of the grass collecting bags 17, 18 and 17. The mesh member 26 minimizes exit of the grass clippings from the grass catcher 12. The grass colecting bags 17, 18 and 17 may be formed of a synthetic resin or a netting material. Where a netting material is used, its mesh should be substantially smaller than that of the mesh member 26, so that the air flows are discharged in substance through the vent 20.

According to the described arrangement of the vent 20 of the conveying air flows and the vent 25 of the cooling air flows, as shown in FIG. 3, the air flows discharged through the vent 20 defined by the cover 16 drift away rearwardly in confluence with the discharged cooling air flows.

What is claimed is:
1. A lawn mower comprising:
   an engine disposed in a rear portion of a vehicle frame,
   a cooling fan for producing cooling air flows for said engine,
   an engine hood covering said engine and defining a passage space for said cooling air flows, said engine hood including a discharge opening directed rearwardly of said vehicle frame,
   a mower unit, and
   grass catcher means for collecting grass clippings transmitted with conveying air flows from said mower unit, said grass catcher means including an air vent disposed upwardly of said engine hood for directing said conveying air flows toward the cooling air flows discharged from said engine hood, and a grass container for holding the grass clippings.

2. A lawn mower as claimed in claim 1, wherein said grass container includes right and left grass collecting bags arranged in opposite lateral regions of said engine hood, and a middle grass collecting bag disposed in a region upwardly of said engine hood.

3. A lawn mower as claimed in claim 1, wherein said grass container opens upwardly and is closed by a cover, said cover at least partly overhanging rearwardly from said grass container to define said air vent.

4. A lawn mower as claimed in claim 3, wherein said grass catcher means further includes a mesh member extending between said air vent and a top opening of said grass container.

5. A lawn mower as claimed in claim 4, wherein said grass container includes netting bags having a smaller mesh than said mesh member.

6. A lawn mower as claimed in claim 1, wherein said grass catcher means is pivotable about a pivotal axis disposed in a rear end region of said engine.

* * * * *